United States Patent
Al-Qaq

(10) Patent No.: US 11,533,113 B2
(45) Date of Patent: *Dec. 20, 2022

(54) TRANSMITTER IMAGE CALIBRATION USING PHASE SHIFT ESTIMATION

(71) Applicant: Huawei Technologies Co., Ltd., Shenzhen (CN)

(72) Inventor: Wael Al-Qaq, Oak Ridge, NC (US)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

This patent is subject to a terminal disclaimer.

(21) Appl. No.: 17/103,601

(22) Filed: Nov. 24, 2020

(65) Prior Publication Data

US 2021/0083781 A1      Mar. 18, 2021

Related U.S. Application Data

(63) Continuation of application No. PCT/CN2019/091010, filed on Jun. 13, 2019, which
(Continued)

(51) Int. Cl.
| | |
|---|---|
| *H04B 17/12* | (2015.01) |
| *H04B 17/21* | (2015.01) |
| *H04L 7/033* | (2006.01) |

(52) U.S. Cl.
CPC ............. *H04B 17/12* (2015.01); *H04B 17/21* (2015.01); *H04L 7/0331* (2013.01)

(58) Field of Classification Search
CPC ........ H04B 17/13; H04B 17/12; H04B 17/11; H04B 17/00; H04B 2001/0425;
(Continued)

(56) References Cited

U.S. PATENT DOCUMENTS

| | | | | |
|---|---|---|---|---|
| 7,123,591 B1* | 10/2006 | Ostertag | ................ | H04B 1/525 370/278 |
| 8,755,756 B1* | 6/2014 | Zhang | .................... | H04B 1/109 455/114.2 |

(Continued)

FOREIGN PATENT DOCUMENTS

| | | |
|---|---|---|
| CN | 1897585 A | 1/2007 |
| CN | 101562591 A | 10/2009 |

(Continued)

OTHER PUBLICATIONS

Chinese Office Action dated Jul. 5, 2021, Chinese Application No. 201980033798.0.
(Continued)

*Primary Examiner* — Khanh C Tran
(74) *Attorney, Agent, or Firm* — Vierra Magen Marcus LLP

(57) ABSTRACT

Techniques are presented to improve the accuracy of and reduce the time required for calibration of an in-phase/quadrature (I/Q) transmission circuit. A measurement receiver measures the I/Q mismatch, where an RF phase shift is introduced to distinguish between the transmitter and measurement receiver I/Q mismatches. Rather than assuming an amount of introduced phase shift, a measurement is used to estimate the phase shift. This phase estimate is then used to determine and correct the I/Q mismatch in the transmitter and measurement receiver. An iterative process can be used to improve the I/Q correction factors. Using simple signal processing to measure the phase shift during calibration and to perform the image calibration calculations, the phase shifter requirements can be significantly relaxed, resulting in faster design time and reduced design area/cost. This approach results in reduced calibration time,
(Continued)

thus contributing to reduced factory production time and enabling faster live mode image calibration.

26 Claims, 10 Drawing Sheets

Related U.S. Application Data is a continuation of application No. 16/007,241, filed on Jun. 13, 2018, now Pat. No. 10,484,108.

(58) Field of Classification Search
CPC ........... H04B 17/21; H04B 2001/0408; H04B 15/00; H04B 1/0042; H04B 1/525; H04B 1/0475; H04B 17/14; H04B 1/401; H04L 7/0331; H04L 27/3863; H04L 27/367; H04L 27/148; H04L 27/368; H04L 27/2649

See application file for complete search history.

(56) References Cited

U.S. PATENT DOCUMENTS

| | | | |
|---|---|---|---|
| 9,344,268 B1 | 5/2016 | Nazemi et al. | |
| 9,641,317 B2 | 5/2017 | Sestok, IV et al. | |
| 10,116,485 B1* | 10/2018 | Liu | H04B 17/354 |
| 2002/0177425 A1* | 11/2002 | Li | H03D 7/18 |
| | | | 455/302 |
| 2005/0014475 A1 | 1/2005 | Kim | |
| 2008/0170651 A1 | 7/2008 | Moutard | |
| 2009/0116578 A1* | 5/2009 | Sperlich | H03F 1/3247 |
| | | | 375/285 |
| 2010/0027689 A1* | 2/2010 | Kohlmann | H04L 27/3863 |
| | | | 375/295 |
| 2010/0104045 A1 | 4/2010 | Santraine et al. | |
| 2011/0075715 A1 | 3/2011 | Kravitz | |
| 2011/0300914 A1* | 12/2011 | Gudem | H04B 1/1027 |
| | | | 455/574 |
| 2013/0287082 A1 | 10/2013 | Chen et al. | |
| 2014/0321516 A1 | 10/2014 | Al-Qaq et al. | |
| 2016/0036486 A1 | 2/2016 | Sestok, IV et al. | |
| 2020/0036454 A1* | 1/2020 | Aoki | H04W 72/048 |

FOREIGN PATENT DOCUMENTS

| | | |
|---|---|---|
| CN | 101729468 A | 6/2010 |
| CN | 101939922 A | 1/2011 |
| CN | 102035561 A | 4/2011 |
| CN | 102090037 A | 6/2011 |
| CN | 103490788 A | 1/2014 |
| CN | 103840768 A | 6/2014 |
| CN | 105282062 A | 1/2016 |
| CN | 107925429 A | 4/2018 |

OTHER PUBLICATIONS

International Search Report & The Written Opinion dated Sep. 11, 2019, International Application No. PCT/CN2019/091010.

Ex Parte Quayle Action dated Jan. 11, 2019, U.S. Appl. No. 16/007,241.

Response to Ex Parte Quayle Action dated Mar. 11, 2019, U.S. Appl. No. 16/007,241.

Notice of Allowance and fee due dated Jun. 7, 2019, U.S. Appl. No. 16/007,241.

* cited by examiner

TRANSMITTER IMAGE CALIBRATION USING PHASE SHIFT ESTIMATION

CLAIM FOR PRIORITY

This application is a Continuation of and claims priority to PCT Patent Application No. PCT/CN2019/091010, filed Jun. 13, 2019, which claims the benefit of priority to U.S. patent application Ser. No. 16/007,241, filed Jun. 13, 2018, now U.S. Pat. No. 10,484,108, the entire contents of which are hereby incorporated by reference.

FIELD

This disclosure generally relates to the calibration of in-phase/quadrature transmitters.

BACKGROUND

Linear in-phase/quadrature (I/Q) transmitters typically suffer from image distortion due to gain and phase imbalances between the in-phase and quadrature paths. Such image distortion typically requires image calibration of the transmitter path using a measurement receiver. However, the measurement receiver itself suffers from a similar image distortion. One way to distinguish between the transmitter and measurement receiver images during calibration is to insert an RF phase shifter in between the transmitter and measurement receiver to provide a known RF phase shift. However, when designing such RF phase shifters over a very wide frequency range covering multiple bands, it becomes a challenging task to design for a near-constant phase shift over a wide frequency range using a single network, mostly due to varying and uncontrollable behavior of layout parasitics over such a wide frequency range.

SUMMARY

According to one aspect of the present disclosure, there is provided an apparatus having a transmission circuit and a transmitter in-phase/quadrature mismatch correction circuit. The transmitter in-phase/quadrature mismatch correction circuit is configured to receive an in-phase/quadrature signal and transmitter correction coefficients and generate a corrected in-phase/quadrature signal based on the transmitter correction coefficients to reduce an amount of in-phase/quadrature mismatch in the received in-phase/quadrature signal. The transmission circuit is configured to receive the corrected in-phase/quadrature signal and to generate therefrom a transmission signal. The apparatus also includes a measurement receiver circuit and a measurement receiver in-phase/quadrature mismatch correction circuit. The measurement receiver circuit is configured to receive the transmission signal and to generate therefrom a measured in-phase/quadrature signal. The measurement receiver in-phase/quadrature mismatch correction circuit is configured to receive the measured in-phase/quadrature signal and receiver correction coefficients and generate a corrected measured in-phase/quadrature signal based on the receiver correction coefficients to reduce an amount of in-phase/quadrature mismatch in the measured in-phase/quadrature signal. An in-phase/quadrature mismatch estimation circuit is configured to receive the corrected measured in-phase/quadrature signal, estimate a phase in the corrected measured in-phase/quadrature signal and generate the transmitter correction coefficients and receiver correction coefficients from the estimated phase.

Optionally, in the preceding aspect, another implementation of the aspect provides that the measurement receiver circuit includes: a first signal path configured to introduce a first phase shift into the measured in-phase/quadrature signal; and a second signal path configured to introduce a second phase shift into the measured in-phase/quadrature signal, wherein the estimated phase is a phase difference between the first phase shift and the second phase shift.

Optionally, in the preceding aspect, another implementation of the aspect provides that the first signal path includes an RC network and the second signal path includes a CR network.

Optionally, in the preceding aspects, another implementation of the aspect provides that the in-phase/quadrature mismatch estimation circuit is configured to generate the transmitter correction coefficients and receiver correction coefficients in an iterative process.

Optionally, in the preceding aspects, another implementation of the aspect provides that the transmission circuit includes a direct-conversion up converter and the measurement receiver circuit includes a direct-conversion down converter.

Optionally, in the preceding aspect, another implementation of the aspect provides that the direct-conversion up converter and the direct-conversion down converter used the same local oscillator signal.

Optionally, in the preceding aspect, another implementation of the aspect provides that a local oscillator signal used by the direct-conversion up converter and the direct-conversion down converter are generated by the same phase locked loop.

Optionally, in the preceding aspects, another implementation of the aspect provides that in-phase/quadrature mismatch estimation circuit configured to operate in the frequency domain to generate therefrom the transmitter correction coefficients and receiver correction coefficients.

Optionally, in the preceding aspects, another implementation of the aspect provides that the transmission circuit includes a power amplifier and the measurement receiver circuit configured to receive the transmission signal from the transmission circuit after the power amplifier.

Optionally, in the preceding aspects, another implementation of the aspect provides that the in-phase/quadrature mismatch estimation circuit determines the transmitter correction coefficients and receiver correction coefficients through a hardware implementation.

Optionally, in the preceding aspects, another implementation of the aspect provides that thein-phase/quadrature mismatch estimation circuit is configured to determine the transmitter correction coefficients and receiver correction coefficients through a firmware implementation.

According to another aspect of the present disclosure, there is provided a method of correcting for in-phase/quadrature mismatch. An in-phase/quadrature signal is received, and a first transmission signal is generated from the received in-phase/quadrature signal. An in-phase/quadrature mismatch is estimated from a measurement of the first transmission signal. A correction of the in-phase/quadrature signal is performed based on the estimated in-phase/quadrature mismatch. A second transmission signal is generated from the corrected in-phase/quadrature signal. A correction of a measurement of the second transmission signal is performed based on the estimated in-phase/quadrature mismatch and a further correction of the in-phase/quadrature signal is performed based on an estimated in-phase/quadrature mismatch from the corrected second measurement in-phase/quadrature signal.

Optionally, in the preceding aspect, another implementation of the aspect provides that in estimating the in-phase/quadrature mismatch from a measurement of the first transmission signal includes estimating a phase difference in the measurement of the first transmission signal.

Optionally, in the preceding aspect, another implementation of the aspect provides that in estimating the in-phase/quadrature mismatch from a measurement of the first transmission signal comprises: receiving the measurement of the first transmission signal from a first signal path configured to introduce a first phase into the measurement; and receiving the measurement of the first transmission signal from a second signal path configured to introduce a second phase into the measurement, wherein the phase difference is a difference between the second phase and the first phase.

Optionally, in the preceding aspects, another implementation of the aspect provides that the method also includes generating a third transmission signal from the further corrected in-phase/quadrature signal; performing a further correction of a measurement of the third transmission signal based on the estimated in-phase/quadrature mismatch; and performing an additional correction of the in-phase/quadrature signal based on an estimated in-phase/quadrature mismatch from the further corrected second measurement in-phase/quadrature signal.

Optionally, in the preceding aspects, another implementation of the aspect provides that the method also includes: generating a local oscillator signal, wherein generating the first transmission signal includes performing a direct-conversion up conversion of the received in-phase/quadrature signal using the local oscillator signal and the measurement of the first transmission signal includes performing a direct-conversion down conversion of the first transmission signal using the local oscillator signal.

According to an additional aspect of the present disclosure, there is provided a wireless communication system, including a signal generation circuit, a quadrature generator, a transmitter, and a calibration section. The signal generation circuit is configured to generate a communication signal. The quadrature generator is configured to generate an in-phase/quadrature signal from the communication signal. The transmitter includes: a transmitter in-phase/quadrature mismatch correction circuit configured to receive an in-phase/quadrature signal and transmitter correction coefficients and generate a corrected in-phase/quadrature signal based on the transmitter correction coefficients to reduce an amount of in-phase/quadrature mismatch in the received in-phase/quadrature signal; and a transmission circuit configured to receive the corrected in-phase/quadrature signal generate therefrom a transmission signal. The calibration section includes: a measurement receiver circuit configured to receive the transmission signal and to generate therefrom a measured in-phase/quadrature signal; and an in-phase/quadrature mismatch estimation circuit configured to receive the measured in-phase/quadrature signal, estimate a phase in the measured in-phase/quadrature signal and to generate the transmitter correction coefficients from the estimated phase.

Optionally, in the preceding aspect, another implementation of the aspect provides that the calibration section also includes a measurement receiver in-phase/quadrature mismatch correction circuit configured to receive the measured in-phase/quadrature signal and receiver correction coefficients and generate a corrected measured in-phase/quadrature signal based on the receiver correction coefficients to reduce an amount of in-phase/quadrature mismatch in the measured in-phase/quadrature signal. The in-phase/quadrature mismatch estimation circuit is configured to receive the measured in-phase/quadrature signal in corrected form and to generate the receiver correction coefficients from the estimated phase.

Optionally, in the preceding aspect, another implementation of the aspect provides that the calibration section further includes: a first signal path configured to introduce a first phase shift into the measured in-phase/quadrature signal; and a second signal path configured to introduce a second phase shift into the measured in-phase/quadrature signal, wherein the estimated phase is a phase difference between the first phase shift and the second phase shift.

Optionally, in the preceding aspects another implementation of the aspect provides that the in-phase/quadrature mismatch estimation circuit is configured to generate the transmitter correction coefficients and receiver correction coefficients in an iterative process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The present disclosure will now be described with reference to the figures, which in general relate to techniques to improve the calibration, and time required for calibration, of an in-phase/quadrature (I/Q) transmission circuit. A measurement receiver is used to measure the I/Q mismatch, where an RF phase shift is introduced to help distinguish between the transmitter and measurement receiver I/Q mismatches. Rather than assuming an amount of introduced phase shift, a measurement is used to estimate the phase shift. This estimate is used to determine and correct the I/Q mismatch in the transmitter and measurement receiver. An iterative process can be used to improve the correction factors. By employing simple signal processing to measure the RF phase shift during calibration and using it to carry out the image calibration calculations in hardware or firmware, the RF phase shifter requirements can be significantly relaxed, resulting in faster design time and reduced design area/cost. This approach results in reduced calibration time, thus contributing to a reduction in factory production time and enabling faster live mode image calibration.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1A:
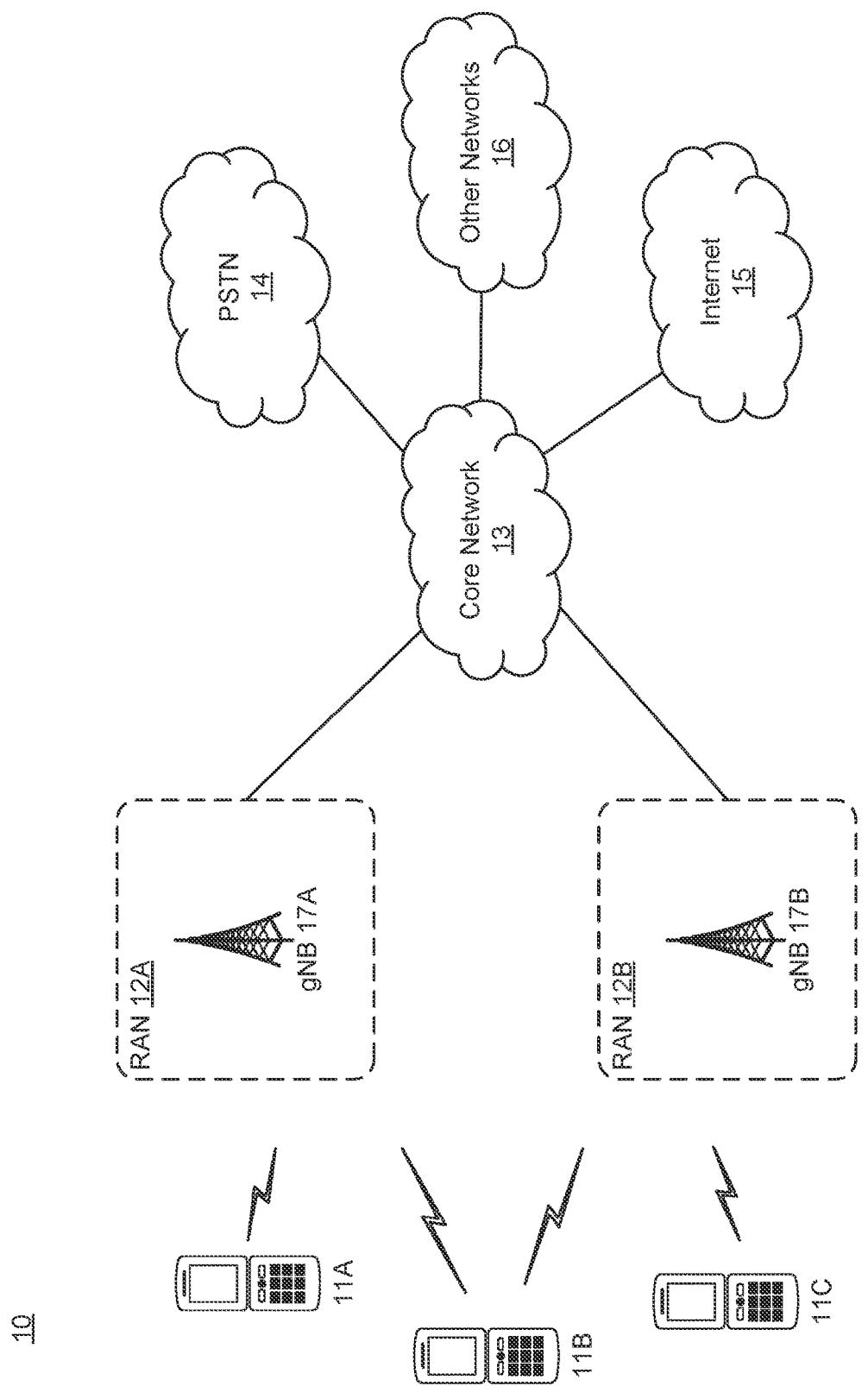
FIG. 1A illustrates a wireless network for communicating data

FIG. 1A illustrates a wireless network for communicating data. The communication system 10 includes, for example, user equipment 11A-11C, radio access networks (RANs) 12A-12B, a core network 13, a public switched telephone network (PSTN) 14, the Internet 15, and other networks 16. Additional or alternative networks include private and public data-packet networks including corporate intranets. While certain numbers of these components or elements are shown in the figure, any number of these components or elements may be included in the system 10.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 10 enables multiple wireless users to transmit and receive data and other content. The system 10 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 11A-11C are configured to operate and/or communicate in the system 10. For example, the user equipment 11A-11C are configured to transmit and/or receive wireless signals or wired signals. Each user equipment 11A-11C represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, the RANs 12A-12B include one or more base stations 17A, 17B (collectively, base stations 17), respectively. Each of the base stations 17 is configured to wirelessly interface with one or more of the UEs 11A, 11B, 11C to enable access to the core network 13, the PSTN 14, the Internet 15, and/or the other networks 16. For example, the base stations (BSs) 17 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the base station 17A forms part of the RAN 12A, which may include other base stations, elements, and/or devices. Similarly, the base station 17B forms part of the RAN 12B, which may include other base stations, elements, and/or devices. Each of the base stations 17 operates to transmit and/or receive wireless signals within a particular geographic region or area, sometimes referred to as a "cell." In some embodiments, multiple-input multiple-output (MIMO) technology may be employed having multiple transceivers for each cell.

The base stations 17 communicate with one or more of the user equipment 11A-11C over one or more air interfaces (not shown) using wireless communication links. The air interfaces may utilize any suitable radio access technology.

It is contemplated that the system 10 may use multiple channel access functionality, including for example schemes in which the base stations 17 and user equipment 11A-11C are configured to implement the Long Term Evolution wireless communication standard (LTE), LTE Advanced (LTE-A), and/or LTE Multimedia Broadcast Multicast Service (MBMS). In other embodiments, the base stations 17 and user equipment 11A-11C are configured to implement UMTS, HSPA, or HSPA+ standards and protocols. Of course, other multiple access schemes and wireless protocols may be utilized.

The RANs 12A-12B are in communication with the core network 13 to provide the user equipment 11A-11C with voice, data, application, Voice over Internet Protocol (VoIP), or other services. As appreciated, the RANs 12A-12B and/or the core network 13 may be in direct or indirect communication with one or more other RANs (not shown). The core network 13 may also serve as a gateway access for other networks (such as PSTN 14, Internet 15, and other networks 16). In addition, some or all of the user equipment 11A-11C may include functionality for communicating with different wireless networks over different wireless links using different wireless technologies and/or protocols.

The RANs 12A-12B may also include millimeter and/or microwave access points (APs). The APs may be part of the base stations 17 or may be located remote from the base stations 17. The APs may include, but are not limited to, a connection point (an mmW CP) or a base station 17 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Although FIG. 1A illustrates one example of a communication system, various changes may be made to FIG. 1A. For example, the communication system 10 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

Figure 1B:
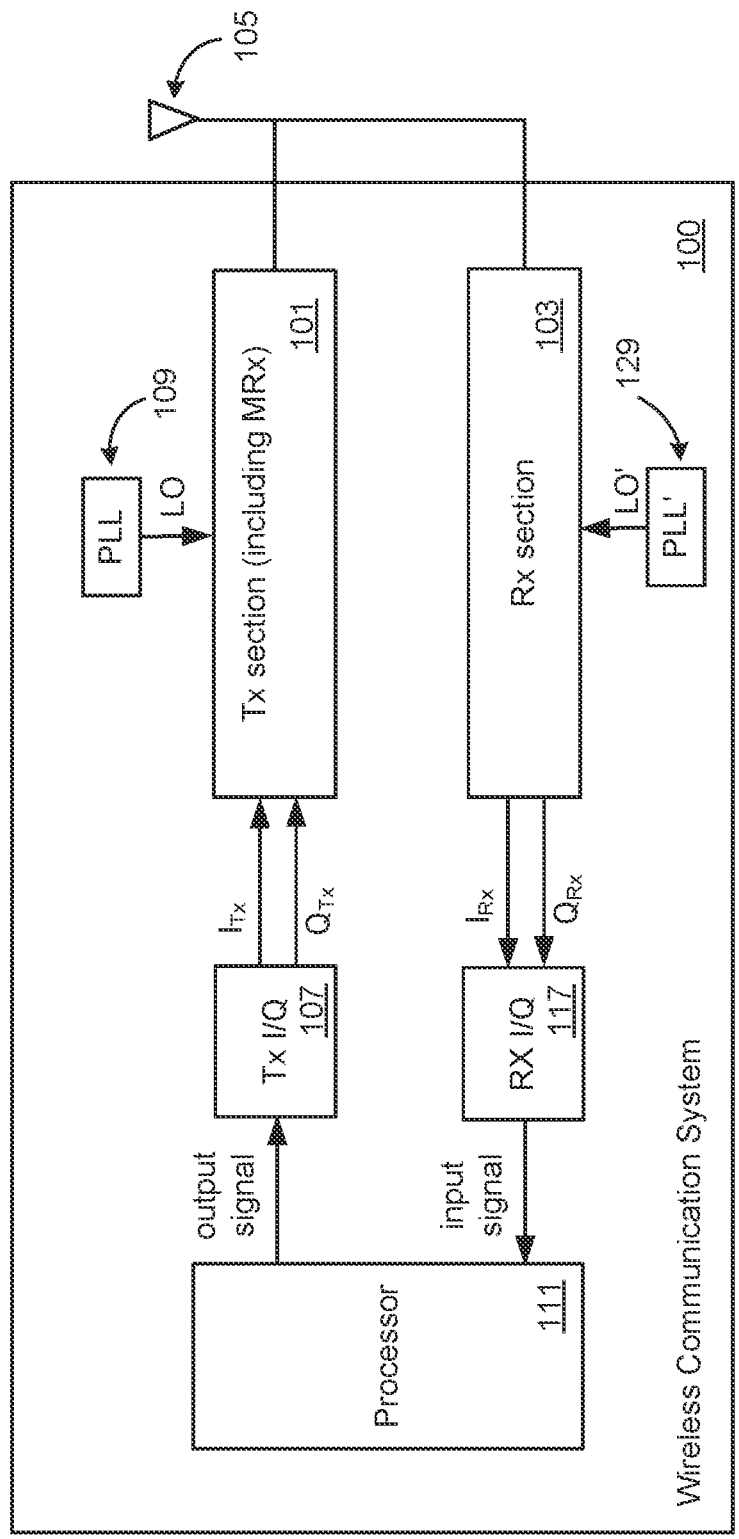
FIG. 1B is block diagram of a wireless communication system that can be used in a network such as in FIG. 1A.

FIG. 1B is block diagram of a wireless communication system 100, such as a mobile phone or user equipment 11A-11C or base station 17, showing some of the elements discussed in the following. To transmit an output signal from the circuit elements of processor 111, a transmitter (Tx) section 101 up converts the output signal from an intermediate frequency (IF) range to the radio frequency (RF) range, amplifies, filters and can perform other process before supplying the transmit signal to the antenna 105. The output signal is provided to the Tx section 101 in in-phase/quadrature (I/Q) format as in-phase and quadrature signals $I_{Tx}$ and $Q_{Tx}$ generated by Tx I/Q block 107. For up converting the signals in Tx section 101 (and, as discussed below, down converting in the measurement receiver MRx), a phase locked loop PLL 109 can provide a local oscillator frequency LO. Although PLL 109 and Tx I/Q section 107 are shown as separate blocks from Tx section 101 in FIG. 1B, depending on the embodiment these elements can be variously combined as circuit elements and implemented in hardware, firmware, software, or a combination of these.

Signals are received by the antenna 105 and supplied to a receiver (Rx) section 103. Rx section 103 performs any needed or wanted signal processing, such as down conversion from the RF range to the IF range and filtering, before passing the signal on to other elements on the device represented at processor 111. A phase locked loop PLL' 129 can provide a local oscillator frequency LO' use in the RF to IF down conversion. In the embodiment of FIG. 1B, the output of the Rx section 103 is in I/Q format and the Rx I/Q section 117 converts this to the receive signal supplied to the processor. Although PLL' 129 and Rx I/Q section 117 are shown as separate blocks from Rx section 103 in FIG. 1B, depending on the embodiment these elements can be variously combined as circuit elements and implemented in hardware, firmware, software, or a combination of these.

Linear in-phase/quadrature (I/Q) transmitters such as Tx section typically suffer from image distortion due to gain and phase imbalances between the in-phase and quadrature paths. Such image distortion can be determined through use of image calibration of the transmitter path using a measurement receiver (MRx). However, the MRx (typically a direct-conversion, zero-If I/Q down-converter) itself suffers from a similar image distortion, so that to be able to be able to determine the distortion from transmit path itself, the MRx introduced image distortion needs to be separated out. One way to distinguish between the Tx and MRx images during calibration is to insert an RF phase shifter in between the Tx and MRx to provide a known RF phase shift (e.g. typically 90 degrees). However, when designing such RF phase shifters, such as through RC/CR networks, to operate over a very wide frequency range covering multiple bands (e.g. 600 MHz to 6 GHz), it becomes a challenging task to design for a near-constant phase shift over the wide frequency range using a single network, mostly due to varying and uncontrollable behavior of layout parasitics over such a wide frequency range.

To help overcome this difficulty, multiple phase shifters can be used with each covering a certain frequency range, but even then, a near-constant phase shift is still not guaranteed and may not be accurately captured from simulations during the design phase due to modeling issues. This complicates the design and results in additional design time/iterations and increased area/cost.

By employing simple signal processing to measure the RF phase shift during calibration and using it to carry out the image calibration calculations in hardware or firmware, the RF phase shifter requirements can be significantly relaxed resulting in faster design time and reduced design area/cost. This approach can result in reduced calibration time, thus contributing to a reduction in factory production time and enabling faster live mode image calibration.

Figure 2:
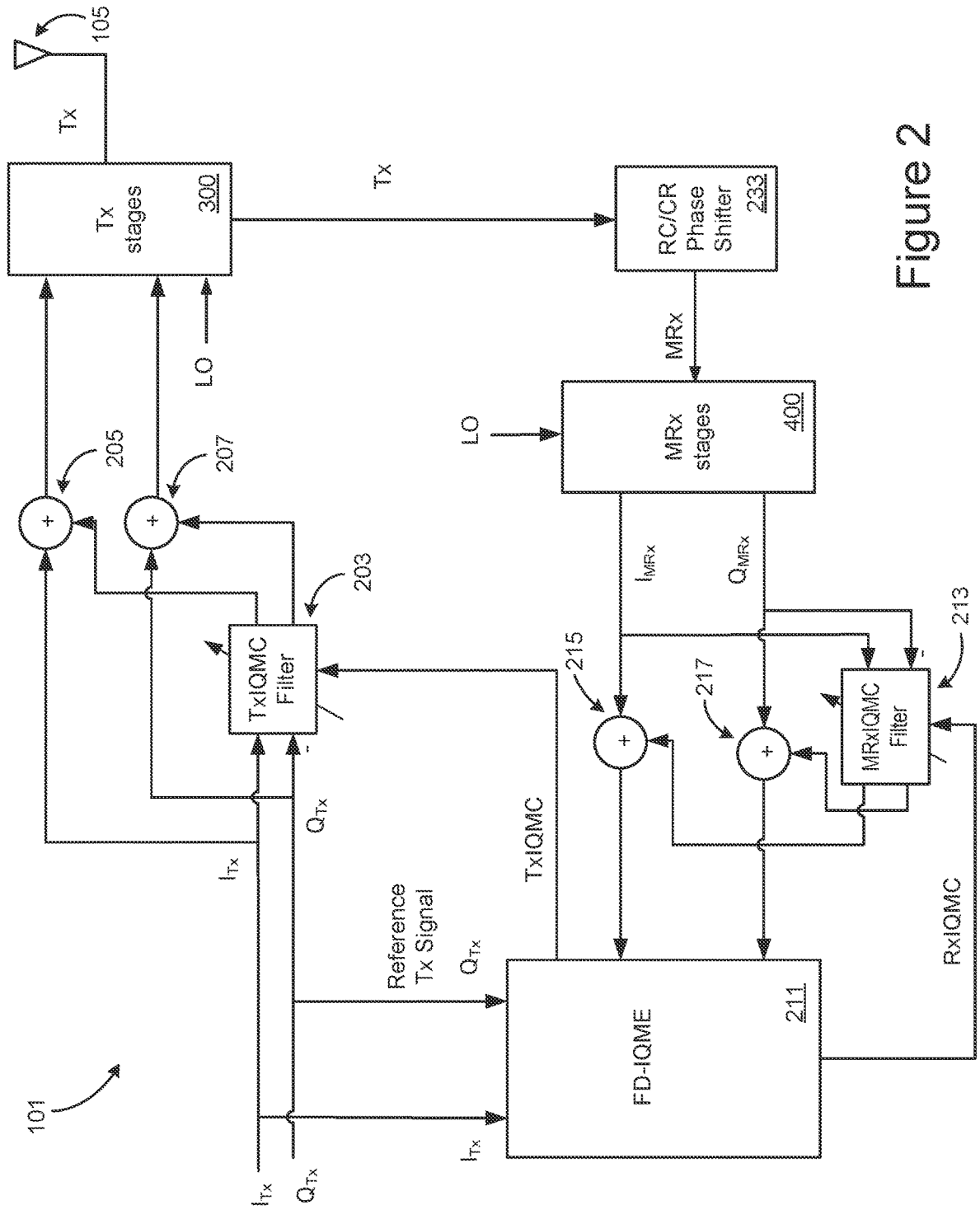
FIG. 2 is a block diagram providing more detail on an embodiment for the transmitter section of FIG. 1B.
Figure 3:
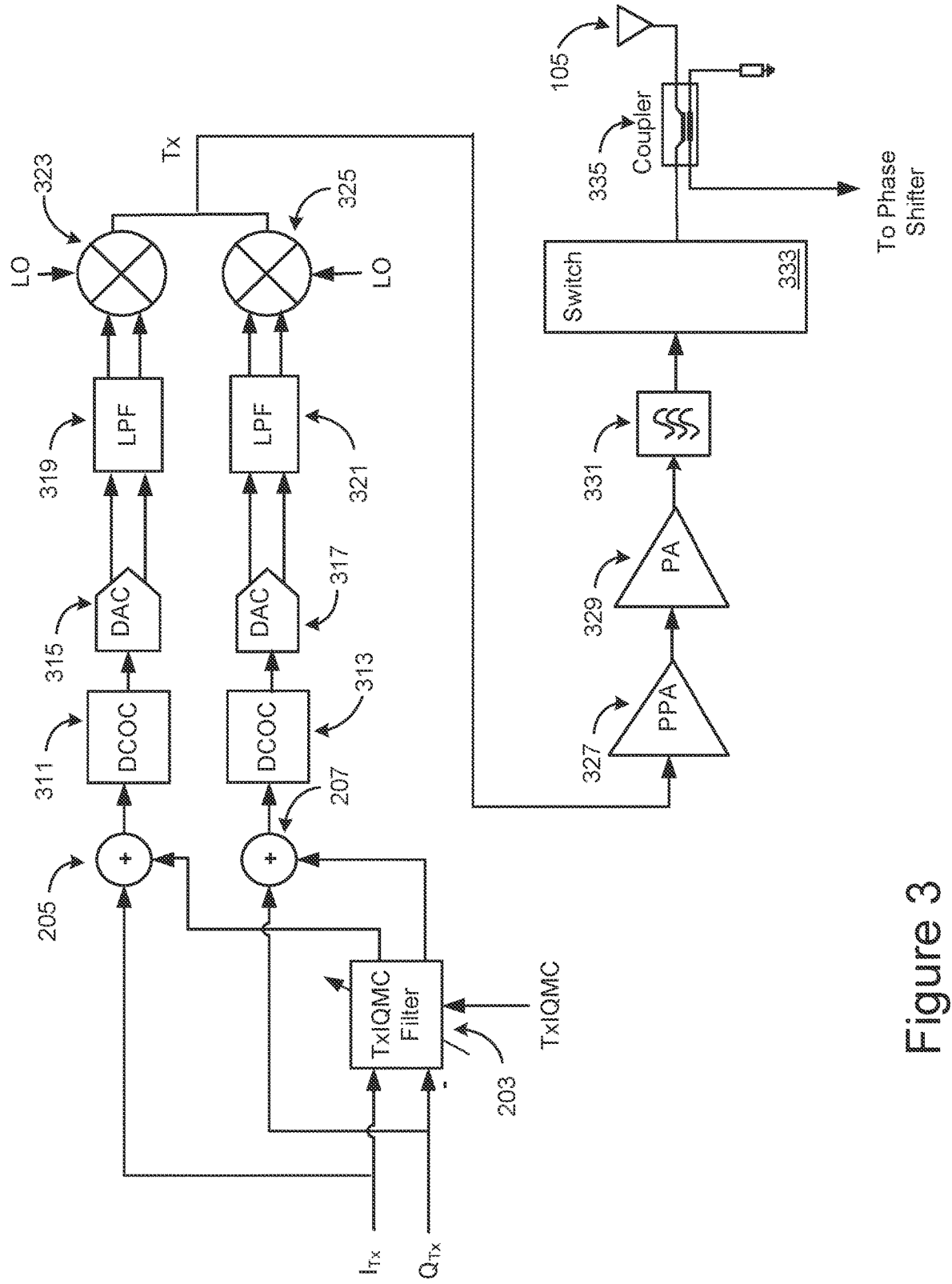
FIG. 3 expands out the transmitter sections of FIG. 2.
Figure 4:
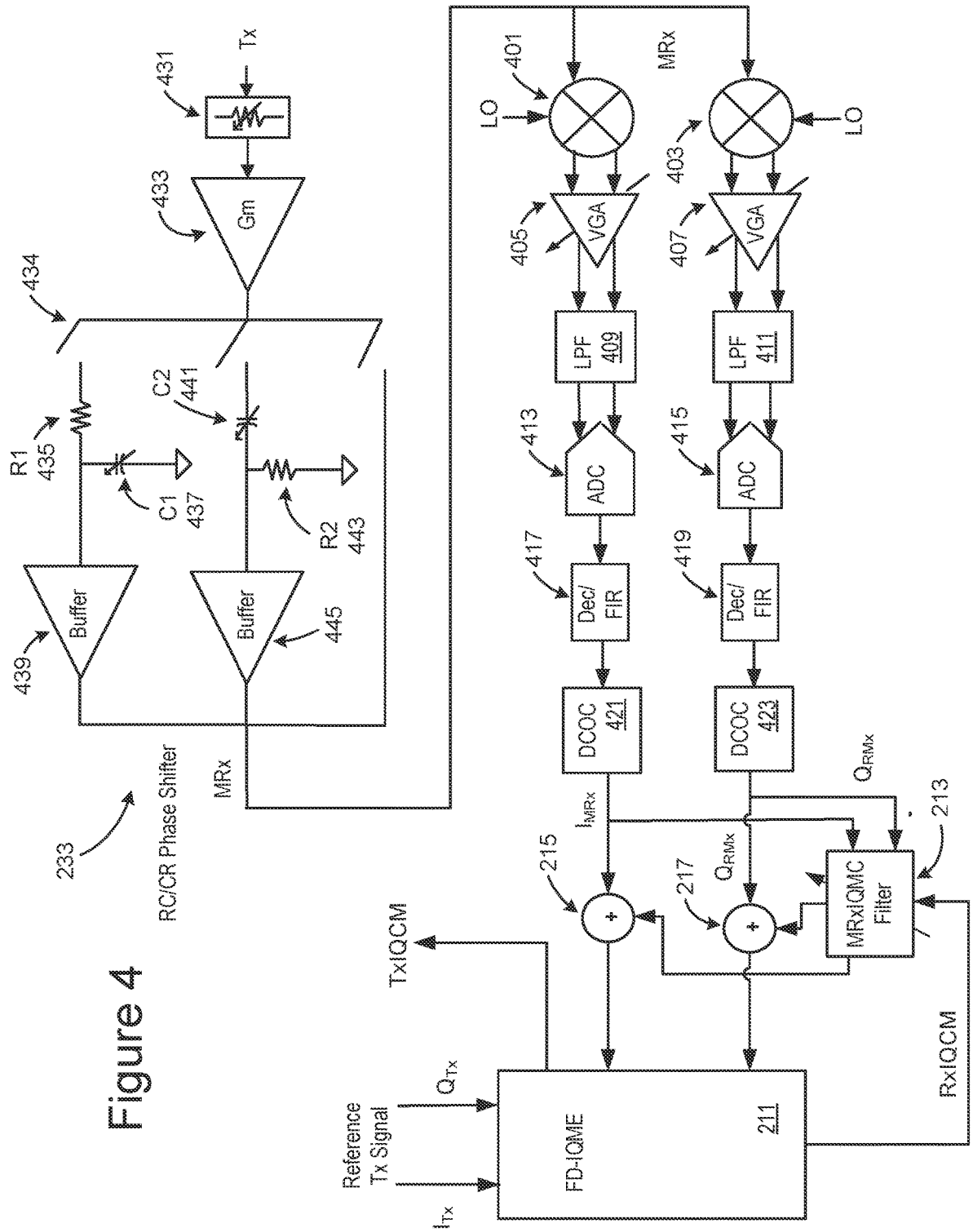
FIG. 4 expands out the measurement receiver sections of FIG. 2.

FIG. 2 is a block diagram providing more detail on an embodiment for the Tx section 101 of FIG. 1B to address these issues, where additional detail for the transmitter (Tx) stages 300 and measurement receiver (MRx) stages 400 are shown in FIGS. 3 and 4, respectively. The block diagram of FIG. 2 shows a typical direct up conversion (DUCT) Tx I/Q transmitter stages 300 and zero-IF (ZIF) measurement receiver MRx stages 400 for measuring and calibrating Tx impairments. The Tx stages 300 receive the in-phase and quadrature signals $I_{Tx}$ and $Q_{Tx}$, directly up convert (using the local oscillator signal LO), amplify, filter and otherwise process the signals as described further with respect to FIG. 3 to generate and supply the transmission signal Tx to antenna 105. To determine correction parameters for any I/Q mismatch in the transmission signal TX, the signal TX is also provided to the measurement receiver portion. Although the signal supplied to the RC/CR phase shifter 233 is also labelled TX, this signal can be tapped at various points along the TX stages 300 so that in some embodiments the signal supplied to the RC/CR phase shifter 233 is the same as supplied to the antenna 105, while in other embodiments in may differ; for example, the RC/CR phase shifter 233 stages may be tapped prior to the power amplifier stage, such as at the output of a preceding power pre-amplifier.

The measurement receiver includes MRx stages 400 that, roughly speaking, undo the processing performed by the Tx stages 300 on the $I_{Tx}$ and $Q_{Tx}$ prior to signal Tx being tapped for measurement As described in more detail with respect to FIG. 4, the RF to IF down conversion can be a direct-down conversion using the same local oscillator frequency LO from the same phase locked loop as used in the direct-conversion up conversion by the Tx stages 300, although other embodiments can use separate source for the local oscillator signals. The output of the MRx stages are then the measurement receiver in-phase and quadrature signals $I_{MRx}$ and $Q_{MRx}$.

Prior to the signal TX being provided to the MRx stages 400, an RF phase shift is introduced by the RC/CR phase shifter 233 to thereby generate the subsequent signal MRx provided to the memory receiver stages 400. The RF phase shifter 233 can be any arbitrary network providing a phase shift, typically 90 degrees. For the embodiments illustrated here, the RF phase shifter is represented by the RC/CR networks shown in FIG. 4, but other embodiments can use other RF phase shifter implementations. It can be difficult to design for an RF phase shifter that maintains a desired (pre-known) phase shift across a wide frequency range, making it difficult to disentangle I/Q mismatches introduced by the measurement receiver from those from the transmit path.

To correct for the I/Q imbalance in the transmission section, the transmission I/Q Mismatch Correction TxIQMC filter 203, shown here in the generic form of a complex filter, introduces corrections at the adders 205 and 207 to cancel out frequency-dependent image distortion. To correct for the I/Q imbalance in MRx section, the measurement receiver I/Q mismatch correction MRxIQMC filter 213, also shown here in the generic form of a complex filter, introduces corrections at the adders 215 and 217 to cancel out frequency-dependent image distortion introduced by the measurement receiver.

The I/Q mismatch correction parameters TxIQMC and RxIQMC for TxIQMC filter 203 and MRxIQMC filter 213 are provided by Frequency-Dependent I/Q Mismatch Estimation(FD-IQME) block 211, where it can generate the TxIQMC and RxIQMC filters based on the $I_{MRx}$ and $Q_{MRx}$ signals and the $I_{Tx}$ and $Q_{Tx}$ reference signals. FD-IQME 211 can employ an estimate of the RF phase shift due to inability of the RF shifter design to provide the desired phase shift in presence of hidden or hard-to-model parasitics, improving over using a fixed estimate for the phase shift.

FIGS. 3 and 4 respectively expand out the transmission and measurement receive paths of FIG. 2, providing additional detail for a set of embodiments of Tx stages 300 and MRx stages 400. More specifically, FIG. 3 repeats antenna 105, TxIQMC filter and adders 205 and 207 from FIG. 2, but expands out the Tx stages 300. In the illustrated embodiment, the adders 205, 207 of the in-phase and quadrature paths are each followed by DC offset correction 311, 313 and a digital to analog converter 315, 317, shown here with a differential output. The signals from DACs 315, 317 then pass through respective low pass filters 319, 321 before being up converted to RF at mixers 323, 325 using the local oscillator signal LO. The I and Q paths are then combined to form the transmission signal Tx, which then goes to power pre-amplifier PPA 327 and power amp PA 329, with the amplified TX signal then passing through a duplex/SAW filter 331 and switch 333 before being supplied to the antenna 105. FIG. 3 is one embodiment for the transmission stages 300 of FIG. 2, but other embodiments can be used with techniques presented here.

The Tx signal can be provided back to the measurement receiver circuit from various points in the transmission path, depending on the embodiment. In FIG. 3, a coupler 335 after the switch 333 provides Tx to the phase shifter preceding the MRx stages. In other embodiments, the transmission sections can be tapped earlier, but typically at some point after the power pre-amp 327.

FIG. 4 expands out the measurement receiver portions of FIG. 2 in one embodiment. More specifically, FD-IQME 211, MRxIQMC filter 213 and adders 215 and 217 are repeated from FIG. 2, but FIG. 4 expands out the phase shifter 233 and the MRx stages 400. In the embodiment of FIG. 4, the signal TX from the coupler 335 is provided to the RF phase shifter 233 through a variable resistor 431 and amplifier Gm 433, where it can be selectively connected by switch 434 to an RC path at top, a CR path in the middle, and a path without an introduced phase shift at bottom. The RC path includes a resistor R1 435 connected between the switch 434 and buffer 439, with the adjustable capacitor C1 437 connected from a node between R1 435 and buffer 439 to ground. For the CR path, the roles of the capacitor and resistor are switched, with an adjustable capacitor C2 441 connected between the switch 434 and buffer 445, with the resistor R2 443 connected from a node between C2 441 and buffer 445 to ground. The output of the selected path is then the MRx signal provided on to the MRx stages.

The buffers 439 and 445 are optional and can be omitted from some embodiments. Inclusion of the buffers can help isolate the RC path of R1 435, C1 437 from the CR path of C2 441, R2 443 and more accurately provide an intended phase shift. However, the buffers come at the cost of area and current. Omitting the buffers may result in making the RC and CR phase shifts less controllable due to reduced isolation; but as the embodiments described here determine the phase shift estimation rather than assume a value based on design, it is less important to design in a more accurate phase shift. Consequently, buffers 439 and 445 may be omitted to save on area and current requirements.

After the phase shift is introduced by the phase shifter 233, the MRx signal is used to generate the in-phase signal $I_{MRx}$ on the upper in-phase path, and the quadrature signal $Q_{MRx}$ on the lower quadrature path. In the embodiment shown in FIG. 4, the MRx input is down converted from RF to IF at mixers 401, 403 using a local oscillator signal. This can be the same local oscillator signal LO from the same phase locked loop as used in the up conversion at mixers 323, 325 in FIG. 3. Variable gain amplifiers VGA 405, 407 provide a differential output to the analog to digital converters ADC 413, 415 though low pass filters 409, 411. The digital signals are then filtered at the decoder/finite impulse response (FIR) blocks 417, 419 and DC offset correction is performed at DCOC 421, 423 to respectively give the in-phase/quadrature signals $I_{MRx}$ and $Q_{MRx}$ for frequency-dependent I/Q mismatch estimation (FD-IQME) block 211.

The measured Tx signal in frequency domain at output of MRx can be written as:

$$Y_{BB}(f) = I_{MRx}(f) + jQ_{MRx}(F) \quad (1)$$
$$= \alpha[K_{T1}(f)K_{R1}(f)e^{j\varphi} + K_{T2}(f)K_{R2}(f)e^{-j\varphi}]$$
$$H(f)X_L(f) +$$
$$\alpha[K_{T2}^*(-f)K_{R1}(f)e^{j\varphi} + K_{T1}^*(-f)K_{R2}(f)e^{-j\varphi}]$$
$$H^*(-f)X_L^*(-f),$$

where:
$X_L(f)$: Tx complex baseband signal
$X^*_L(f)$: Tx complex baseband image signal
$K_{T1}(f)$, $K_{T2}(f)$, $K_{R1}(f)$, $K_{R2}(f)$: Frequency-dependent Tx, MRx I/Q mismatch coefficients
$H(f)$: Cascaded frequency response of Tx+MRx paths
$\alpha$: Attenuation through TX+MRx path at a given LO frequency
$\varphi$: RF phase of Tx+MRx path for a given LO frequency Ignoring the term $K_{T2}(f)K_{R2}(f)$, which is a very good approximation and becomes better with more iterations, the above equation can be re-arranged as:

$$Y_{BB}(f) \approx \alpha[K_{T1}(f)K_{R1}(f)e^{j\varphi}]H(f)[X_L(f)+\{A(f)+B(f)e^{-j2\varphi}\}C(f)X^*_L(-f)] \quad (2)$$

where:
$A(f)=K^*_{T2}(-f)/K_{T1}(f)$
$B(f)=K^*_{T1}(-f)K_{R2}(f)/K_{T1}(f)K_{R1}(f)$
$C(f)=H^*(-f)/H(f)$.

The factor $C(f)=1$ for no RF passive asymmetry, and for some asymmetry, its impact is reduced after one iteration and is ignored in the following.

Applying this last equation to RC path of the phase shifter 233 with a phase $\varphi_1$ gives:

$$Y_{BB1}(f) \approx H_3(f)[X_L(f) + H_1(f)X^*_L(-f)], \quad (3)$$

where $H_3(f)$ corresponds to the terms $\alpha_1[K_{T1}(f)K_{R1}(f)e^{j\varphi_1}]$ $H(f)$ in equation (2) and $H_1(f)$ corresponds to $\{A(f)+B(f)e^{-j2\varphi_1}\}$. Similarly, for the CR path of the phase shifter 233 with a phase $\varphi_2$, this gives:

$$Y_{BB2}(f) \approx H_4(f)[X_L(f) + H_2(f)X^*_L(-f)]. \quad (4)$$

The RF phase shift (or delta) between the RC and the CR paths for a given LO frequency is then $\Delta\varphi=\varphi_2-\varphi_1$. Equations (3) and (4) can form the basis for frequency-dependent I/Q mismatch estimation using Fast Fourier Transform (FFT) domain estimation, $H_1(f)$, $H_2(f)$, $H_3(f)$, $H_4(f)$ or time domain estimation h1(t),h2(t),h3(t),h4(t).

In previous arrangements, the phase shift $\Delta\varphi$ is typically assumed pre-known, and this assumed value is used in the final calculations of frequency domain I/Q mismatch correction parameters, but it is difficult to control its value using RF phase shifters over a wide frequency range. To improve the corrections, the embodiments here generate an estimate for the phase shift $\Delta\varphi=\varphi_2-\varphi_1$, which can be used in an iterative process to further improve the results. One method for deriving the four filters h1, h2, h3, h4 is to use a least mean square (LMS) adaptation, as shown in the embodiments describe below with respect to FIGS. 5 and 6. The information from FIGS. 5 and 6 can then be used to generate as an estimation of the phase shift $\Delta\varphi$, such using the embodiment illustrated with respect to FIG. 7 and equation (9) below. These values provide a method for employing the RF phase shift $\Delta\varphi$ in the final calculations to generate the Tx and MRxIQMC filters, where an embodiment is given below with respect to equations (7.1) and (7.2). Alternative embodiments can employ an approach different from LMS in deriving the TxIQMC and MRxIQMC filters, but the final filter calculations have to employ a proper estimate of the phase shift if the final goal is to speed up the convergence and reduce calibration time and allow for a more relaxed RF phase shifter design requirement.

Figure 5:
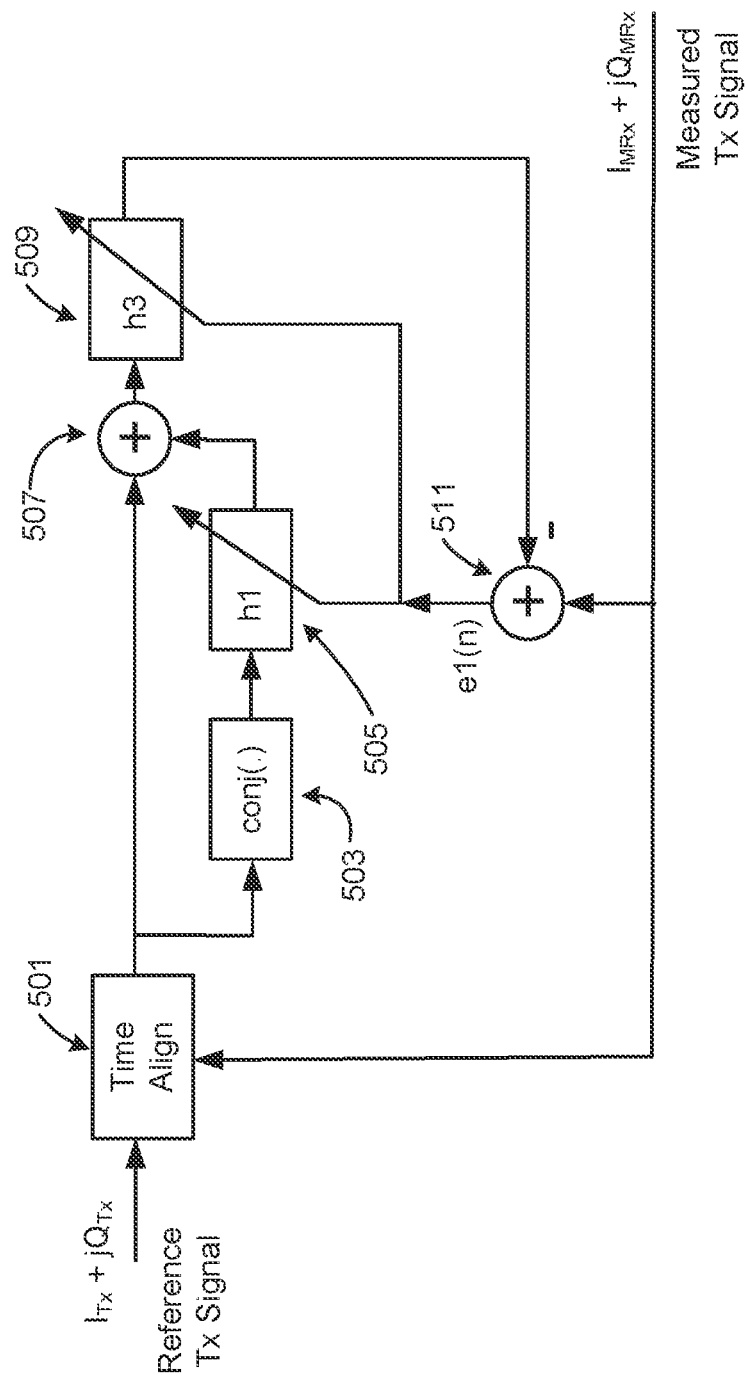
FIGS. 5 and 6 respectively look at embodiments a Least Mean Squares (LMS) adaptation of the RC path and of the CR path of FIG. 4 for the frequency-dependent I/Q mismatch estimation block.
Figure 6:
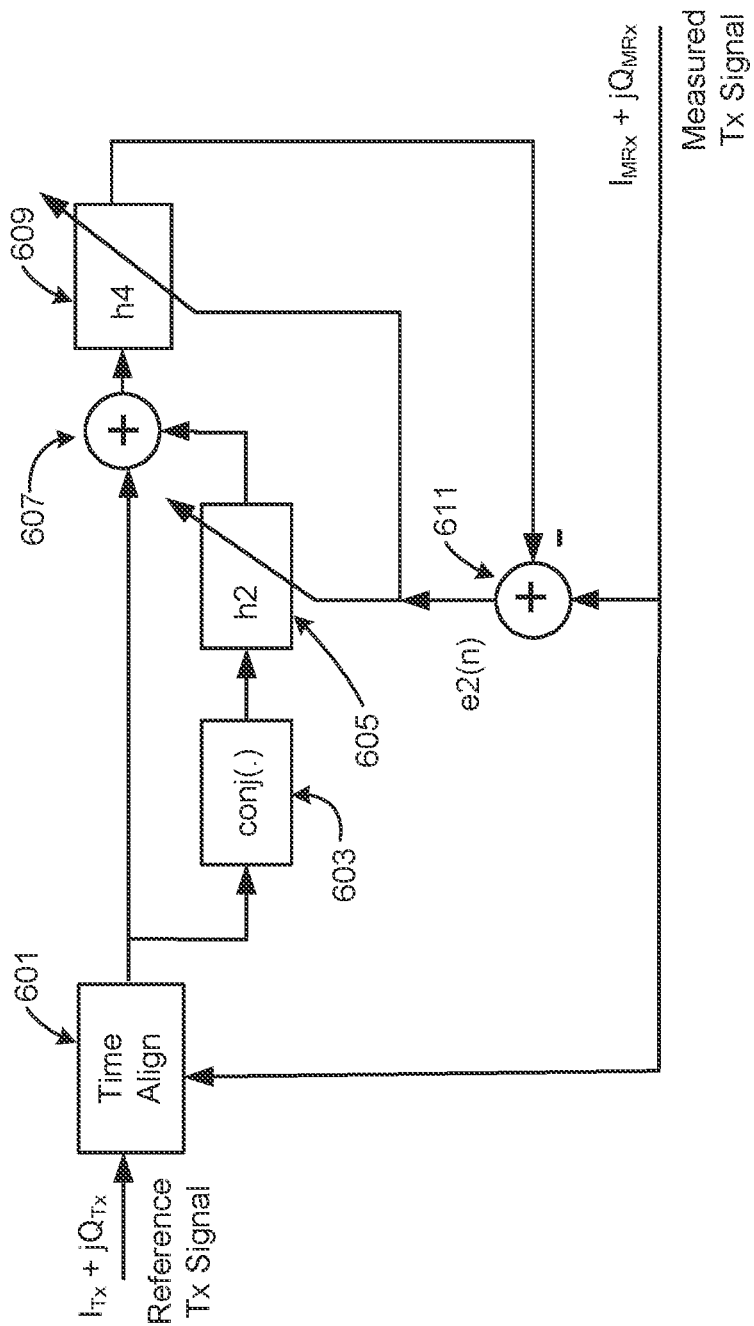

FIGS. 5 and 6 respectively look at embodiments of the RC path (top path of phase shifter 233 of FIG. 4) LMS adaptation and of the CR path (middle path of phase shifter 233 of FIG. 4) LMS adaptation for FD-IQME 211. In both cases the inputs are the reference Tx signals $I_{Tx}$ and $Q_{Tx}$ and the measured signals $I_{MRx}$ and $Q_{MRx}$. In both of FIGS. 5 and 6, all signal paths are complex.

In FIG. 5, the inputs $I_{Tx}+jQ_{Tx}$ and $I_{MRx}+jQ_{MRx}$ are time aligned at block 501, with the output then split with one output going directly to the adder 507. The other leg is conjugated at block 503 and filtered by h1 505, before going to adder 507. The combined signals then go to filter h3 509, whose output then is supplied to adder 511 to be subtracted from the measured values $I_{MRx}+jQ_{MRx}$ to determine the error factor e1(n) used to set the filters h1 505 and h3 509. In the embodiment shown here, h1 can be a two-tap filter and h3 a one-tap filter, but, more generally, can be multi-tap filters.

For the CR path of FIG. 6, the inputs $I_{Tx}+jQ_{Tx}$ and $I_{MRx}+jQ_{MRx}$ are again time aligned at block 601, with the output then split and one output going directly to the adder 607. The other leg is conjugated at block 603 and filtered by h2 605, before going to adder 607. The combined signals then go to filter h4 609, whose output then is supplied to adder 611 to be subtracted from $I_{MRx}+jQ_{MRx}$ to determine the error factor e2(n) used to set the filters h2 605 and h4 609. In the embodiment shown here, h2 can be a two-tap filter and h4 a one-tap filter, but, more generally, can be multi-tap filters.

In general, the $h_3$ and $h_4$ filters are represented by the same number of taps. Similarly, the $h_1$ and $h_2$ filters are also represented by same number of taps. For most practical applications, it is sufficient to use one-tap for $h_3$ and $h_4$ while more than one-tap is typically used for $h_1$ and $h_2$ to compensate for a frequency dependent image. For stronger image frequency-dependency, more filter taps can be used for $h_1$ and $h_2$.

For the RC complex LMS adaptation as illustrated in FIG. 5, at iteration n representing the nth digital time sample:

$$h_1(n)=h_1(n-1)+2\mu e_1(n-1)h^*_3(n-1)*x_L(n-1); \text{ and} \quad (5.1)$$

$$h_3(n)=h_3(n-1)+2\mu e_1(n-1)\{x^*_L(n-1)+h^*_1(n-1)*x_L(n-1)\}, \quad (5.2)$$

where the inline * represents the convolution operator, and the * superscript represents conjugation. Similarly, for the CR complex LMS adaptation as illustrated in FIG. 6, at iteration n:

$$h_2(n)=h_2(n-1)+2\mu e_2(n-1)h^*_4(n-1)*x_L(n-1); \text{ and} \quad (6.1)$$

$$h_4(n)=h_4(n-1)+2\mu e_2(n-1)\{x^*_L(n-1)+h^*_2(n-1)*x_L(n-1)\}, \quad (6.2)$$

where the inline * represents the convolution operator, and the * superscript represents conjugation. The transmitter and measurement receiver I/Q mismatch (multi-tap) correction factors are then:

$$\text{TxIQMC}=(h_2 e^{j2\Delta\varphi}-h_1)/(1-e^{j2\Delta\varphi}) \quad (7.1)$$

$$\text{RxIQMC}=[(h_2-h_1)/(1-e^{-j2\Delta\varphi})]\times[h_3/h^*_3], \quad (7.2)$$

where x represents multiplication, the * superscript on $h_3$ represents conjugation. Equation (9) below gives one embodiment for determining the RF phase shift $\Delta\varphi$. Depending on the embodiment, determination of these values can be implemented in hardware, firmware, software, or various combinations of these.

Typically, the Tx and MRx FDIQMC corrections can be improved after several iterations, where for each $k^{th}$ iteration, e.g. N samples (i.e. time samples n=0 to N−1) using the RC path are processed as shown in FIG. 5 and discussed above followed by processing N samples using the CR path as shown in FIG. 6 and discussed above. This means at each $k^{th}$ iteration, the resulting FDIQMC filter coefficients are applied back to the Tx and MRx before continuing with the calibration for the next iteration. This can be expressed as:

$$\text{TxIQMC}(k)=\text{TxIQMC}(k-1)+\alpha[(h_2(k)e^{j2\Delta\varphi(k)}-h_1(k))/(1-e^{j2\Delta\varphi(k)})]; \text{ and} \quad (8.1)$$

$$\text{RxIQMC}(k)=\text{RxIQMC}(k-1)+\alpha\{[(h_2(k)-h_1(k))/(1-e^{-j2\Delta\varphi(k)})]\times[h_3(k)/h^*_3(k)]\}, \quad (8.2)$$

where k is the $k^{th}$ iteration and a is a forgetting factor between 0 and 1.

Figure 7:
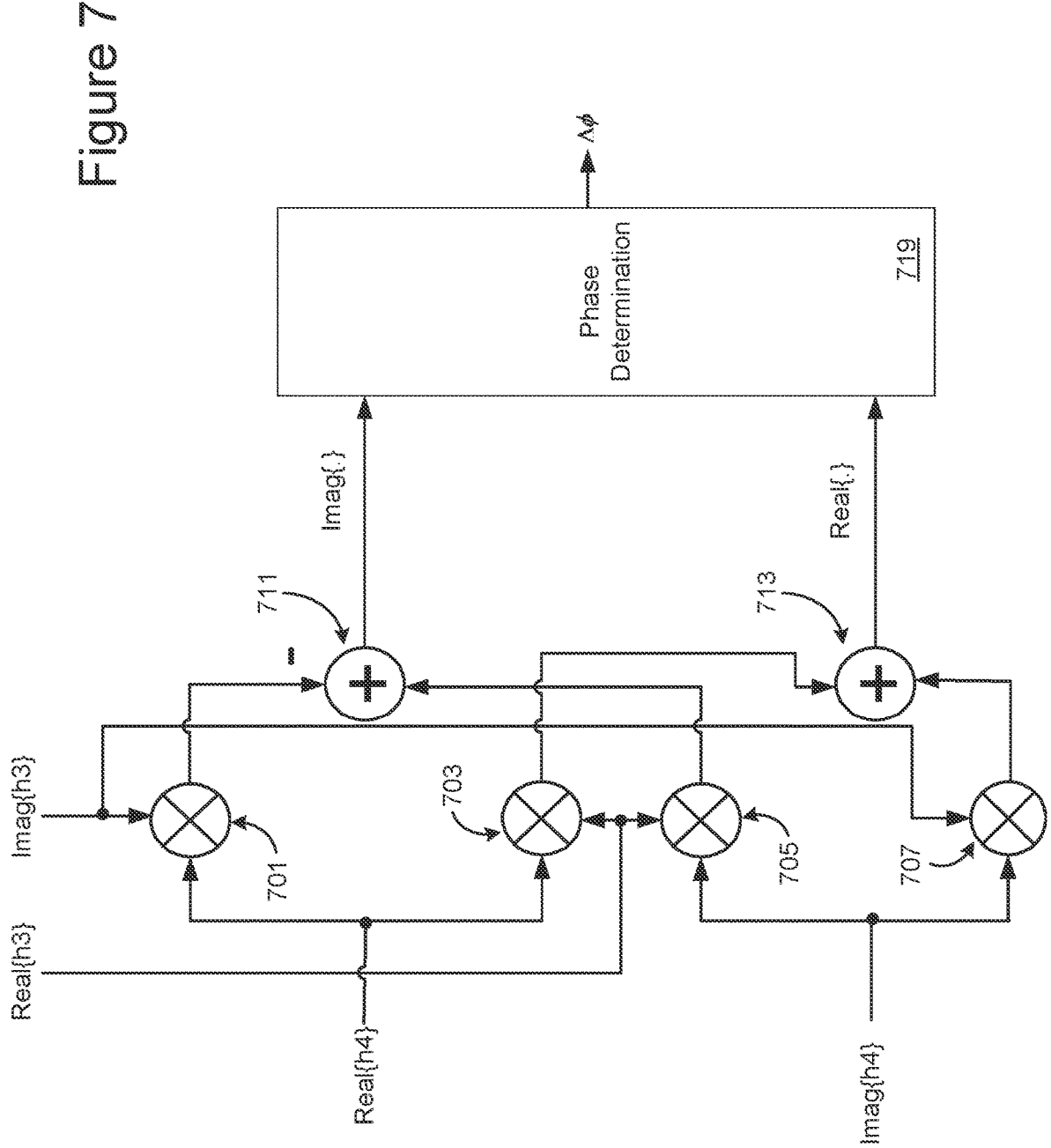
FIG. 7 is a block diagram illustrating an embodiment of how to determine phase differences between the RC and CR paths.

Since it is typically difficult to precisely control the RF phase shift (or delta) $\Delta\varphi$, it can be estimated at each $k^{th}$ iteration using hardware or firmware by the following simple equation to within, for example, less than +/−1 degrees of error of the actual phase shift:

$$\Delta\varphi(k)=\text{angle}\{h_4(k)h^*_3(k)\}, \quad (9)$$

where the * superscript in the above equation is the complex conjugate. Note that the $\Delta\varphi$ equation (9) above is simply evaluating the angle of the multiplication of two complex numbers. This can be done in hardware using a CORDIC (Coordinate Rotation Digital Computer), or a lookup table, or can be done in firmware, as shown in FIG. 7. The estimated phase shift can then be used in the TxIQMC and MRxIQMC filter calculations of equations (7.1), (7.2) or (8.1), (8.2) to help reduce the number of iterations and calibration time. The estimate of the RF phase shift $\Delta\varphi$ can be obtained according to other embodiments as well, but, for any of these embodiments, the use of a determined phase estimate can help provide form more accurate and more quickly converging image correction coefficients.

FIG. 7 is a block diagram illustrating one embodiment of how the real and imaginary parts of the h3 and h4 can be used to determine $\Delta\varphi$. The real parts of h3 and h4 are multiplied at 703 and the imaginary parts of h3 and h4 are multiplied at 707, with the two results added at 713. After being summed over any multiple taps at 717, this provides the Real input to phased determination block 719. The mixed real/imaginary parts of the real part of h4 and the imaginary part of h3 are multiplied at 701 and the real part of h3 and imaginary part of h4 are multiplied at 705, with the results (with a minus for the result from 701) added at 711 and the Imag input to phase determination block 719. Based on the Real and Imag values, phase determination block 719 can determine $\Delta\varphi$ using a CORDIC, a lookup table, or firmware depending on the embodiment. The determined estimation of the phase shift $\Delta\varphi$ can then be used in the TxIQMC and MRxIQMC filter calculations to help reduce the number of iterations and calibration time.

As an example, an LTE20 MHz signal was used to calibrate the Tx and MRx images in the presence of a 5% mismatch between the Tx I & Q low pass filters. This typically means the Tx IQMC filter will require at least two-taps to correct for the image frequency-dependency. Five iterations were used in the system with an MRx measurement SNR=25 dB. To limit impact of noise on the calibration, the forgetting factor $\alpha$ was set to 1 for the first two iteration and to 0.75 for the third iteration and finally to 0.25 for the remaining iterations. Smaller a results in longer convergence time, but is more immune to low MRx SNR conditions. This is illustrated with respect to FIG. 8.

Figure 8:
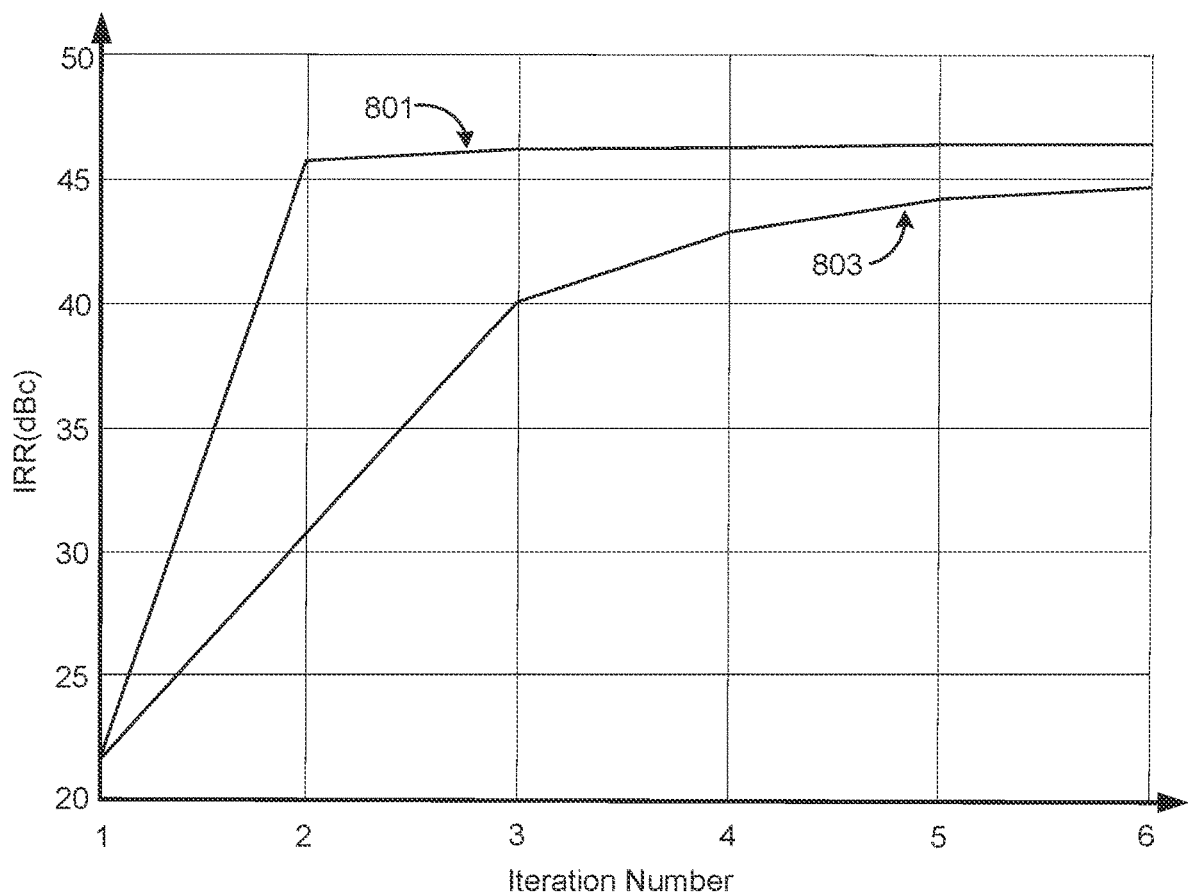
FIG. 8 illustrates the convergence of the calibration parameters with and without phase shift estimation.

FIG. 8 is a plot of iteration number versus image rejection ratio (IRR, in decibels relative to carrier, dBc) with RF phase shift estimation (801) and without phase shift estimation (803) to illustrate convergence, for an example with a SNR=25 dB and 2 taps used for $h_1$ and h2. In this example, the system was designed to introduce a 90° phase shift, but due to parasitics and design and process variations, the actual shift was 70°. After just one iteration using the phase shift estimate, the IRR shows better performance than using many more iterations based on an assumed 90° phase shift.

Figure 9:
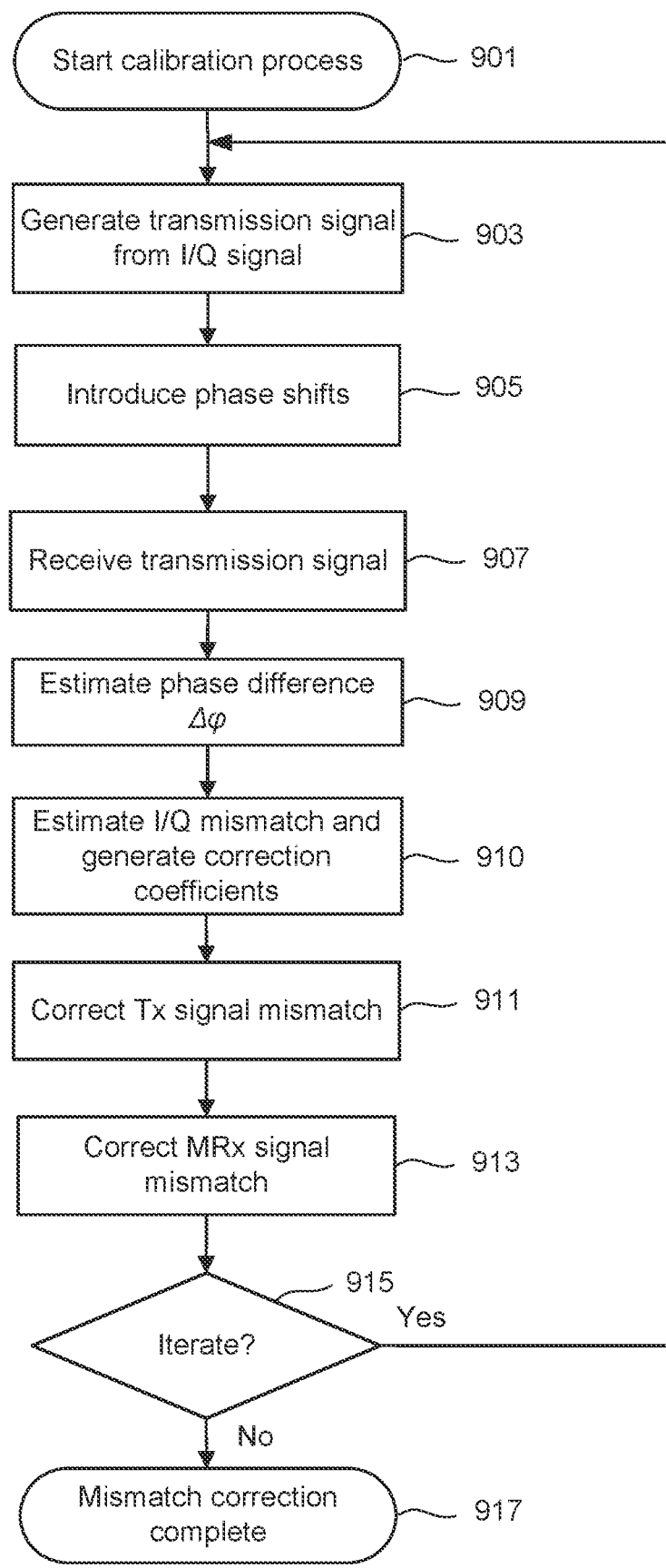
FIG. 9 is a flow illustrating the operation of the elements of FIGS. 1-7 in determining the correction parameters for the I/Q mismatch in the transmitter of FIG. 2.

FIG. 9 is a flow illustrating the operation of the elements of FIGS. 1-7 in determining the correction parameters for the I/Q mismatch in the transmitter section, starting at 901. At 903 the in-phase/quadrature signals $I_{Tx}$, $Q_{Tx}$ are received at the transmission section 101, from which the stages of the transmission section generate the transmission signal Tx. In addition to supplying the signal Tx to the antenna 105, Tx is also supplied to the measurement receiver section.

At the measurement receiver, at 905 the phase shifter 233 introduces the phase shifts in the received Tx signal to generate the MRx signal for the subsequent measurement receiver stages 400. The transmission signal with the added phase shifts is then the MRx signal, from which the measurement I/Q signals $I_{MRx}$, $Q_{MRx}$ are generated. The measurement I/Q signals $I_{MRx}$, $Q_{MRx}$ are then supplied to the frequency-dependent I/Q mismatch estimation block 211, being received there at 907.

As described with respect to FIGS. 5-7, the FD-IQME block 211 receives the measurement I/Q signals $I_{MRx}$, $Q_{MRx}$ and the initial input I/Q signals $I_{Tx}$, $Q_{Tx}$. From these signals, at 909 the system estimates the phase difference $\Delta\varphi$ between phases introduced into the RC path and the CR path as described above with respect to FIG. 7 and equation (9). At 910, the estimated phase difference $\Delta\varphi$ is used this to estimates the I/Q mismatch and generates the correction parameters TxIQMC and RxIQMC, as described as described above with respect to equations (7.1), (7.2) and (8.1), (8.2).

At 911, the TxIQMC parameters are provided to the transmission I/Q mismatch correction filter 203, with the corrections made to the input I/Q signals $I_{Tx}$, $Q_{Tx}$ at adders 205 and 207. The RxIQMC parameters are provided to the measurement receiver I/Q mismatch correction filter 213, with the corrections made to the input I/Q signals $I_{MRx}$, $Q_{MRx}$ at adders 215 and 217 at 913 for the input signals for the FD-IQME block 211.

The determination of whether to perform additional iterations is made at 915. Depending on the embodiment, this can be a set number of iterations or can be determined based on factors such as the accuracy of the current iteration or amount of change from the previous iteration. If more iterations are needed or desired, the flow loops back to 903. Once 915 determines that no more iterations are to be performed, the I/Q mismatch correction operation is complete at 917.

This process improves the I/Q mismatch correction process for the transmitter and memory receiver image calculations by determining an estimate of the introduced RF phase shift and not simply assuming the phase shift to be a pre-known value. The RF phase shifter design does not have to yield a precise or pre-known phase shift since RF phase shift estimation is used in the Tx and MRx image calculations. Additionally, relative to some other techniques that use separate phase locked loops for the Tx and MRx up and down converters, the embodiments described here can use the same PLL to drive both the Tx and MRx sections, thus reducing power consumption, area, and phase noise at MRx output.

The technology described herein can be implemented using hardware, firmware, software, or a combination of these. The software or firmware used can be stored on one or more processor readable storage devices to program one or more of the blocks of FIGS. 2-7 to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by the components described above. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software or firmware can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A transmitter, comprising:
   a transmitter TX section configured to produce a TX signal;
   a power pre-amplifier (PPA) coupled to receive the TX signal and a power amplifier (PA), configured to produce an amplified TX signal;
   a coupler, coupled to receive the amplified TX signal and configured to provide the amplified TX to a measurement receiver circuit; and
   wherein the measurement receiver circuit includes a phase shifter that further comprises:
   a first signal path configured to introduce a first phase shift into a measured in-phase/quadrature signal;
   a second signal path configured to introduce a second phase shift into the measured in-phase/quadrature signal; and
   a third signal path not configured to introduce a phase shift.

2. The transmitter of claim 1, wherein the first signal path includes an RC network and the second signal path includes a CR network.

3. The transmitter of claim 2, wherein the RC network comprising:
   a first resistor, coupled in series in the first signal path; and
   an adjustable capacitor coupled in shunt to ground in the first signal path.

4. The transmitter of claim 3, wherein the RC network comprising:
   a second adjustable capacitor, coupled in series in the second signal path; and
   a second resistor coupled in shunt to ground in the second signal path.

5. The transmitter of claim 2, wherein the measurement receiver circuit further comprises:
   a first buffer coupled to the RC network; and
   a second buffer coupled to the CR network.

6. The transmitter of claim 1, wherein the measurement receiver circuit further comprising a switch configured to selectively provide the amplified Tx to the first signal path, the second signal path and the third signal path.

7. The transmitter of claim 1, wherein the measurement receiver circuit further comprising a variable resistor coupled between the coupler and phase shifter.

8. The transmitter of claim 1, wherein the measurement receiver circuit further comprising:
   an amplifier coupled between the coupler and phase shifter.

9. The transmitter of claim 1, wherein the transmission circuit includes a direct-conversion up converter and the measurement receiver circuit includes a direct-conversion down converter.

10. The transmitter of claim 9, wherein the direct-conversion up converter and the direct-conversion down converter used the same local oscillator signal.

11. The transmitter of claim 9, wherein a local oscillator signal used by the direct-conversion up converter and the direct-conversion down converter are generated by the same phase locked loop.

12. The transmitter of claim 9, wherein the measurement receiver circuit further comprising an in-phase path and a quadrature path.

13. The transmitter of claim 1, further including circuitry to generate an estimated phase that reflects a phase difference between the first phase shift and the second phase shift.

14. An apparatus, comprising:
a transmitter in-phase/quadrature mismatch correction circuit configured to receive, from a quadrature generator, an in-phase/quadrature phase signal and transmitter correction coefficients and to generate a corrected in-phase/quadrature phase signal based on the transmitter correction coefficients to reduce an amount of in-phase/quadrature mismatch in the received in-phase/quadrature phase signal;
a measurement receiver in-phase/quadrature phase mismatch correction circuit configured to receive a measured in-phase/quadrature phase signal, generated from a transmission signal based on the corrected in phase/quadrature phase signal, and receiver correction coefficients and generate a corrected measured in-phase/quadrature phase signal based on the receiver correction coefficients to reduce an amount of in-phase/quadrature mismatch in the measured in-phase/quadrature phase signal; and
an in-phase/quadrature phase mismatch estimation circuit configured to receive the corrected measured in-phase/quadrature phase signal, and to estimate a phase in the corrected measured in-phase/quadrature phase signal and to generate the transmitter correction coefficients and receiver correction coefficients from the estimated phase.

15. The apparatus of claim 14, wherein the measurement receiver circuit includes:
a first signal path configured to introduce a first phase shift into the measured in-phase/quadrature phase signal; and
a second signal path configured to introduce a second phase shift into the measured in-phase/quadrature phase signal, wherein the estimated phase is a phase difference between the first phase shift and the second phase shift.

16. The apparatus of claim 15, wherein the first signal path includes an RC network and the second signal path includes a CR network.

17. The apparatus of claim 14, wherein the in-phase/quadrature phase mismatch estimation circuit is configured to generate the transmitter correction coefficients and receiver correction coefficients in an iterative process.

18. The apparatus of claim 14, further comprising:
a transmission circuit configured to receive the corrected in-phase/quadrature phase signal and to generate therefrom the transmission signal; and
a measurement receiver circuit configured to receive the transmission signal and to generate therefrom the measured in-phase/quadrature phase signal.

19. The apparatus of claim 18, wherein the transmission circuit includes a power amplifier and the measurement receiver circuit configured to receive the transmission signal from the transmission circuit after the power amplifier.

20. The apparatus of claim 14, further comprising:
an in-phase/quadrature phase mismatch estimation circuit configured to receive the corrected measured in-phase/quadrature phase signal, and to estimate a phase in the corrected measured in-phase/quadrature phase signal and to generate the transmitter correction coefficients and receiver correction coefficients from the estimated phase.

21. The apparatus of claim 20, wherein the measurement receiver circuit includes:
a first signal path configured to introduce a first phase shift into the measured in-phase/quadrature phase signal; and
a second signal path configured to introduce a second phase shift into the measured in-phase/quadrature phase signal, wherein the estimated phase is a phase difference between the first phase shift and the second phase shift.

22. The apparatus of claim 21, wherein the first signal path includes an RC network and the second signal path includes a CR network.

23. The apparatus of claim 22, wherein the in-phase/quadrature phase mismatch estimation circuit configured to operate in a frequency domain to generate therefrom the transmitter correction coefficients and receiver correction coefficients.

24. A wireless communication system, comprising:
a signal generation circuit configured to generate a communication signal;
a quadrature generator configured to generate an in-phase/quadrature signal from the communication signal;
a transmitter comprising:
a transmitter in-phase/quadrature mismatch correction circuit configured to receive an in-phase/quadrature signal and transmitter correction coefficients and generate a corrected in-phase/quadrature signal based on the transmitter correction coefficients to reduce an amount of in-phase/quadrature mismatch in the received in-phase/quadrature signal; and
a calibration section comprising:
an in-phase/quadrature mismatch estimation circuit configured to receive a measured in-phase/quadrature signal, estimate a phase in the measured in-phase/quadrature signal and to generate the transmitter correction coefficients from the estimated phase.

25. The wireless communication system of claim 24, further comprising:
a transmission circuit configured to receive the corrected in-phase/quadrature signal generate therefrom a transmission signal; and
the calibration section further comprising:
a measurement receiver circuit configured to receive the transmission signal and to generate therefrom the measured in-phase/quadrature signal.

26. The wireless communication system of claim 24, the calibration section further comprising:
a measurement receiver in-phase/quadrature mismatch correction circuit configured to receive the measured in-phase/quadrature signal and receiver correction coefficients and generate a corrected measured in-phase/quadrature signal based on the receiver correction coefficients to reduce an amount of in-phase/quadrature mismatch in the measured in-phase/quadrature signal,
wherein the in-phase/quadrature mismatch estimation circuit is configured to receive the measured in-phase/quadrature signal in corrected form and to generate the receiver correction coefficients from the estimated phase.

* * * * *

UNITED STATES PATENT AND TRADEMARK OFFICE
CERTIFICATE OF CORRECTION

PATENT NO. : 11,533,113 B2
APPLICATION NO. : 17/103601
DATED : December 20, 2022
INVENTOR(S) : Wael Al-Qaq It is certified that error appears in the above-identified patent and that said Letters Patent is hereby corrected as shown below:

In the Claims

Column 16, Line 48 (Claim 6, Line 3), please replace "Tx" with -- TX --

Signed and Sealed this
Twenty-first Day of March, 2023

Katherine Kelly Vidal
*Director of the United States Patent and Trademark Office*